United States Patent [19]

Maas et al.

[11] Patent Number: 5,224,189

[45] Date of Patent: Jun. 29, 1993

[54] HIGH PRESSURE FIBER OPTIC SPLICE AND METHOD OF FABRICATION

[75] Inventors: Steven J. Maas, Simi Valley; A. Douglas Meyer, West Hills; Dennis P. Bevan, Concord, all of Calif.

[73] Assignee: Litton Systems, Inc., Beverly Hills, Calif.

[21] Appl. No.: 816,878

[22] Filed: Jan. 2, 1992

[51] Int. Cl.$^5$ ............................................. G02B 6/38
[52] U.S. Cl. ................................... 385/98; 385/97
[58] Field of Search .................. 385/95, 96, 97, 98, 385/99, 80

[56] References Cited

U.S. PATENT DOCUMENTS

| | | | |
|---|---|---|---|
| 4,158,477 | 6/1979 | Phillips et al. | 385/95 |
| 4,195,045 | 3/1980 | Mead | 385/80 X |
| 4,330,171 | 5/1982 | Malsot et al. | 385/80 |
| 4,333,705 | 6/1982 | Mead | 385/80 |
| 5,061,034 | 10/1991 | Fujikawa et al. | 385/95 |

*Primary Examiner*—Frank Gonzalez
*Assistant Examiner*—Phan Thi Heartney
*Attorney, Agent, or Firm*—Lynn & Lynn

[57] ABSTRACT

A housing for a fiber optic splice protects the splice from the external to environment. Two optical fibers may be butt-coupled in a connector, which is then coated with a hard resin material. The hard resin material is then overcoated with a resilient material to provide shock protection and strain relief. The connector may be placed in a housing, which is covered and sealed to form a water-tight seal between the cover and the housing.

2 Claims, 2 Drawing Sheets

HIGH PRESSURE FIBER OPTIC SPLICE AND METHOD OF FABRICATION

This invention was made with support under contract N00014-87-C-2223 awarded by the Naval Research Laboratory. The United States government has certain rights in this invention.

BACKGROUND OF THE INVENTION

This invention relates generally to fabrication and protection of splices in single mode optical fiber for use in harsh environments such as high pressure, underwater conditions.

Many different techniques are currently used to form splices in optical fiber. Fusion splices, mechanical splices and various connectors are used to join the ends of optical fibers. A rotary mechanical splice has been demonstrated in underwater applications. The rotary splice and other splices are exposed to the external environment and can become damaged if they are dropped or improperly handled. Previous splices have the added disadvantage of allowing water leakage into the fiber optic cables. Such leakage can damage the cables or sensors connected to the cables.

SUMMARY OF THE INVENTION

The present invention provides a housing for a fiber optic splice or connector and protects the splice from the external environment. A splice formed using the housing is more rugged than conventional splices. A splice formed according to the invention can be handled without causing damage to the splice. The invention provides a splice that is shielded from the surroundings, sealed against water penetration and maintained at atmospheric pressure.

A method according to the present invention for connecting two optical fibers end-to-end comprises the steps of butt-coupling or fusing an end of one of the optical fibers to an end of the other optical fiber to form a couple or splice and encasing it in a hard resin material. The hard resin material is then overcoated with a resilient material to provide shock protection and strain relief.

The method according to the present invention for connecting two optical fibers end-to-end may also comprise the steps of butt-coupling or fusing an end of one of the optical fibers to an end of the other optical fiber to form a couple or splice, placing the coupling in a housing, and connecting the two halves of the housing to form a water-tight seal.

The method according to the present invention for connecting two optical fibers end-to-end may also comprise the steps of inserting ends of the two optical fiber in corresponding hollow cylindrical housing sections. The ends of the optical fibers are butt-coupled to each other to form a coupling, and the first and second housing sections are engaged and threaded together. Seals are then formed in the first and second housing sections to protect the coupling from exposure to the external environment. Strain relief is provided at locations adjacent where the first and second optical fibers enter the first and second housing sections, respectively.

DESCRIPTION OF THE PREFERRED EMBODIMENT

Figure 1:
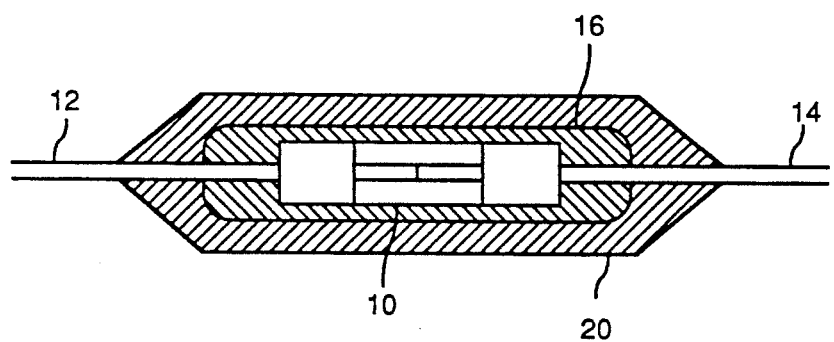
FIG. 1 is a cross-sectional view of a first embodiment of a fiber optic splice housing and connector assembly according to the present invention.
Figure 2:
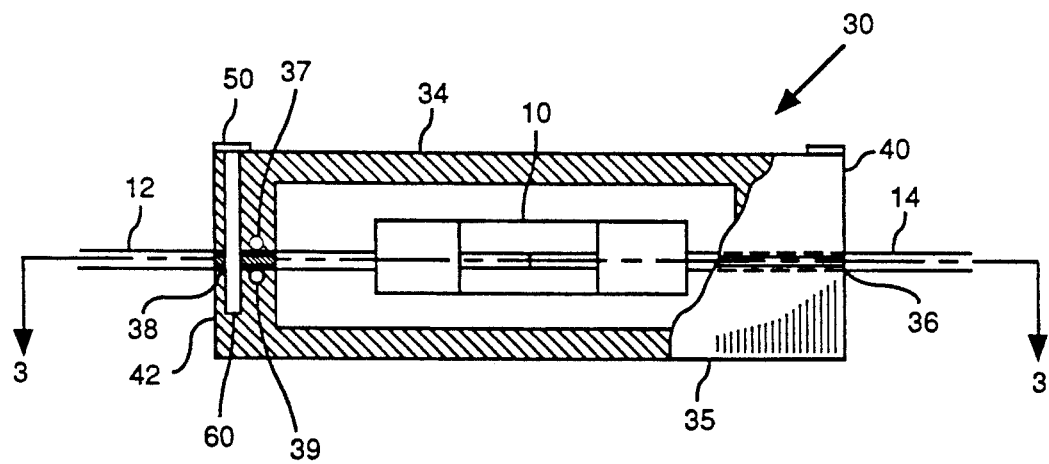
FIG. 2 is a cross-sectional view of a second embodiment of a splice housing according to the present invention.
Figure 3:
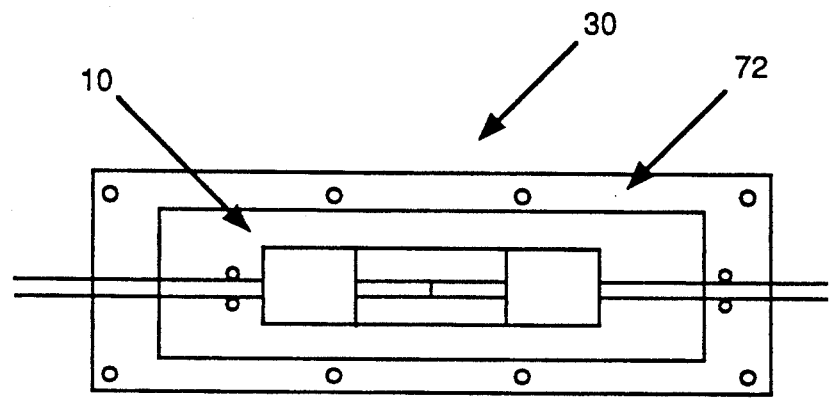
FIG. 3 is a cross-sectional view taken along line 3—3 of FIG. 2.

Referring to FIGS. 1-3, a fiber optic connector 10 is assembled onto a pair of cables 12 and 14 that are preferably steel reinforced. The fiber optic cables are butt-coupled as shown in FIGS. 1-3.

The exterior of the connector 10 is abraded without damaging it. The connector 10 is then cleaned using cleaning agents such as acetone and isopropyl alcohol. The abraded and cleaned connector 10 is then placed in a mold (not shown) and encapsulated in a casing 16 that is preferably formed of a hard epoxy resin material. A preferred material for the casing 16 is a resin known as "Chockfast Orange," a trademark of Philadelphia Resins Corp. The casing 16 provides the water blocking and strength necessary for the splice to survive under high pressure conditions.

After the casing material has completely cured, its outer surface is cleaned, abraded and cleaned again. The casing 16 is then molded with an overcoat 20 formed of a material such as polyurethane. The urethane overcoat 20 provides protection against shock and provides strain relief for the fiber optic cables 12 and 14.

Referring to FIGS. 2 and 3, the present invention includes a housing 30 that may be opened to connect and disconnect the connector assembly 10. The housing 30 may be formed as a box by fitting together upper and lower halves 34 and 35, respectively. The fiber optic cable 14 passes through an opening 36 formed in a first end 40 in the housing 30. Similarly, the fiber optic cable 12 passes through an opening 38 formed in a second end 42 in the housing 30. A plurality of bolts 50 pass through openings in the upper housing half 34 and are threaded into corresponding holes 60 in the lower housing half 35 to secure the upper housing half 34 and the lower housing half 35 together. An O-ring seal 37 is placed over the end of the fiber optic cables 12 and 14 and retained within a groove 39. A second seal 72 is placed between the tow housing halves 34 and 35 to prevent the intrusion of water into the assembled housing 30.

Figure 4:
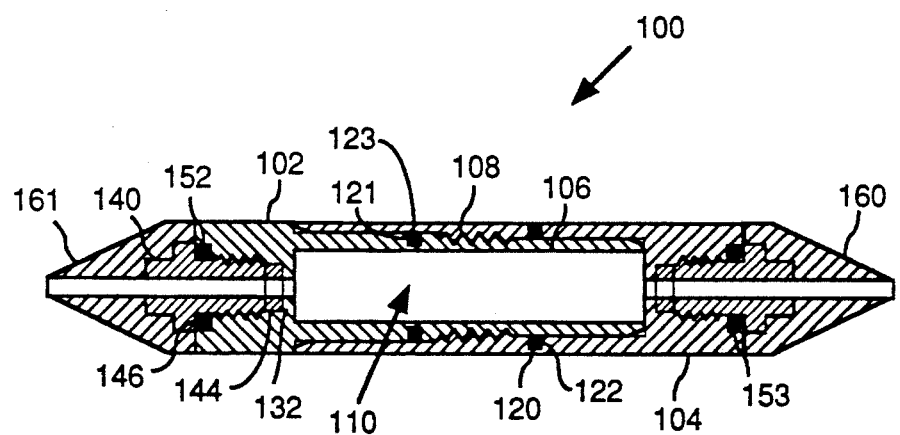
FIG. 4 is a cross-sectional view of a third embodiment of a splice housing according to the present invention.

FIG. 4 illustrates a third embodiment of the invention. A housing 100 includes a pair of elongate cylindrical members 102 and 104 that have threadedly midsections, 106 and 108, respectively. The elongate cylindrical member 104 has a hollow, generally cylindrical portion 110 formed for receiving an end of the elongate cylindrical member 102. The end of the elongate cylindrical member 102 is chamfered to facilitate its insertion into the elongate cylindrical member 104. An O-ring groove 122 is formed in the interior wall of the elongate cylindrical member 104 to receive an O-ring seal 120. Similarly, an O-ring groove 123 is formed in the interior wall of the elongate cylindrical member 102 to receive an O-rings seal 121. These O-rings 120 and 121 prevent the intrusion of water through the juncture of the members 102 and 104.

Still referring to FIG. 4, the end of the a fitting 140 is threaded into the outer end of the cylindrical members 102. A similar fitting 141 is threaded into the outer end of the member 104. The connections of the fittings 140 and 141 to the members 102 and 104, respectively, are essentially identical. A seal 144 is placed between the end face of the fitting 140 and an interior wall 132 of the housing 100. An O-rings 152 is placed in a groove 154 formed in the outside end face of the member 102. Similarly, an O-rings 153 is placed in a groove 155 formed in the outside end face of the member 104. The fitting 140 includes a flange face 146 that causes the O-rings 152 to compress and form a water-tight seal. Polyurethane strain n 160 and 161 are molded over the fiber optic cables 12 and 14 and the corresponding ends of the fittings 140 and 141.

The structures and methods disclosed herein illustrate the principles of the present invention. The invention may be embodied in other specific forms without departing from its spirit or essential characteristics. Therefore, the described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A splice between ends of two optical fibers, comprising:
    a coupling formed between the end of one of the optical fibers;
    a housing having an upper half and a lower half formed to enclose the coupling, the housing having a pair of openings therein for allowing the two optical fibers to pass from the coupling to a region outside the housing;
    the upper half of the housing having a first pair of semicircular grooves formed in opposite ends thereof;
    the lower half of the housing having a second pair of semicircular grooves formed in opposite ends thereof, the first and second semicircular grooves being arranged such that when the upper and lower housing sections are assembled together, a pair of O-ring grooves are formed at opposite ends of the housing; and
    a pair of O-rings placed in the O-ring grooves to form a water-tight seal between the cover and the upper and lower halves of the housing.

2. A splice between ends of two optical fibers, comprising:
    a first hollow cylindrical housing section having a first opening therein for receiving a first optical fiber therein;
    a second hollow cylindrical housing section having a second opening therein for receiving a second optical fiber therein, the first and second housing sections being formed to fit together telescopingly together;
    a first fitting threadedly engaged in the first opening;
    a seal formed between an inner portion of the first fitting and the first optical fiber;
    an O-ring seal formed between an outer portion of the first fitting and an inner portion of the first housing section;
    a second fitting threadedly engaged in the second opening;
    a seal formed between an inner portion of the second fitting and the second optical fiber;
    an O-ring seal formed between an outer portion of the second fitting and an inner portion of the second housing section;
    outer threads being formed on the first housing section and inner threads being formed on the second housing section, the inner and outer threads being engaged when the first and second housing sections are assembled together, the first housing section having a first peripheral groove formed therein adjacent the outer threads, the second housing section having a second groove formed therein adjacent the inner threads, the first and second grooves being arranged so that when the first and second housing sections are assembled together, the inner and outer threads are between the first and second grooves;
    a first O-ring seal placed in the first groove;
    a second O-ring seal placed in the second groove, the first and second O-ring seals forming a water-tight seal around the inner and outer threads;
    a coupling formed between the ends of the first and second optical fibers;
    a first elastomeric strain relief connected to an end of the first housing section to reduce strain on the first fiber; and
    a second strain relief connected to an end of the second housing section to reduce strain on the first fiber.

* * * * *